(12) United States Patent
Stuebs et al.

(10) Patent No.: US 7,910,047 B2
(45) Date of Patent: Mar. 22, 2011

(54) THROUGH FITTINGS AND A METHOD FOR GAS ASSIST MOLDING OF THROUGH FITTINGS

(75) Inventors: Michael Troy Stuebs, San Antonio, TX (US); William A. Edwards, San Antonio, TX (US); Jason K. Weiss, San Marcos, TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 1442 days.

(21) Appl. No.: 10/255,815

(22) Filed: Sep. 26, 2002

(65) Prior Publication Data
US 2004/0062881 A1    Apr. 1, 2004

(51) Int. Cl.
*B29C 49/06*    (2006.01)
(52) U.S. Cl. ............... 264/513; 264/294; 264/328.1
(58) Field of Classification Search ............... 264/537, 264/294, 513, 328.1; 29/890.148
See application file for complete search history.

(56) References Cited

U.S. PATENT DOCUMENTS

| | | | | |
|---|---|---|---|---|
| 3,291,670 A | * | 12/1966 | Usab | 156/245 |
| 3,729,791 A | * | 5/1973 | Theobald | 29/890.148 |
| 5,090,743 A | * | 2/1992 | Obering | 285/133.21 |
| 5,112,563 A | * | 5/1992 | Baxi | 264/572 |
| 5,118,455 A | * | 6/1992 | Loren | 264/40.3 |
| 5,439,416 A | * | 8/1995 | Jaskowiak | 464/181 |
| 5,447,762 A | * | 9/1995 | Loren | 428/34.1 |
| 5,787,959 A | * | 8/1998 | Laxmanan et al. | 164/66.1 |
| 5,798,080 A | * | 8/1998 | Ogura et al. | 264/572 |
| 6,149,825 A | * | 11/2000 | Gargas | 210/788 |
| 6,250,903 B1 | * | 6/2001 | Fernandez et al. | 425/130 |
| 6,322,865 B1 | * | 11/2001 | Winget et al. | 428/35.7 |
| 6,386,852 B1 | * | 5/2002 | Berdan | 425/130 |
| 6,430,812 B1 | * | 8/2002 | Sanders | 29/890.148 |
| 6,630,086 B1 | * | 10/2003 | Goral et al. | 264/40.4 |
| 2001/0037573 A1 | * | 11/2001 | Kuschel et al. | 29/890.148 |
| 2003/0011111 A1 | * | 1/2003 | Pearson | 264/572 |

FOREIGN PATENT DOCUMENTS

| DE | 4204627 | 8/1993 |
|---|---|---|
| DE | 9617484 | 1/1998 |

* cited by examiner

*Primary Examiner* — Monica A Huson
(74) *Attorney, Agent, or Firm* — Christopher L. Makay (57) ABSTRACT

A method for molding through parts employs gas-assist molding techniques. The method includes closing a mold to create a part cavity, injecting resin into the mold, injecting a gas into a resin stream to create hollow sections in the part, opening the mold, and ejecting a part using conventional mold ejection techniques. The final step of the process includes trimming the as-molded part to expose the through section of the fitting. The fitting may be molded with sealing features for use in tubing assemblies. Advantages of this process include higher working pressure ranges, as well as reduced manufacturing costs and assembly time. The molded tubing fitting formed in this process invention is a through fitting which incorporates features representing o-rings installed on a part into the mold and ultimately into the exterior surface of the molded fitting. This process may eliminate injection molded o-ring fittings from the connection entirely. Further applications may include manifolds or parts with internal passageways.

3 Claims, 7 Drawing Sheets

AS-MOLDED CONFIGURATION

FIGURE 5
AS-MOLDED CONFIGURATION

THROUGH FITTINGS AND A METHOD FOR GAS ASSIST MOLDING OF THROUGH FITTINGS

BACKGROUND OF THE INVENTION

1. Field of the Invention

The present invention relates to molded fittings and, more particularly, but not by way of limitation, to molded through fittings with sealing features manufactured using a gas-assist molding process.

2. Description of the Related Art

In the industries relating to dispensing and metering technologies, flow systems typically have components such as valves, pumps, or flowmeters that must be connected in a prescribed order. Tubing assemblies typically adapt to the components that are in a flow system. There are many types of connections, illustratively, oetiker clamps, o-rings, threaded, and barb fittings. Use of these connection types sometimes is linked to the type of tubing materials being used, including stainless steel, copper, nylon and layered or reinforced materials. One other factor driving fitting choice is whether a connection needs to be removable or permanent. Removable connections including threaded connections and o-ring connections, are typically more expensive than the permanent types of connections. This is due to the increased number of operations required to manufacture the items. The permanent types of connections include barb fittings and oetiker clamps. These types of items are high volume manufacturable items, thereby reducing manufacturing costs and eventually pricing.

O-ring connections are typically used on a machined or molded fitting where a component must be serviceable, i.e., easily removable and replaceable, in a tubing system. In cases where two components must be connected together using o-ring connections, the result was a short piece of tubing, most likely stainless steel, with o-ring retainers welded on each of the ends. Each of the pieces must be made separately and then welded together. This scenario also requires one to two o-rings per termination as well as assembly labor. Consequently, the simple connection between two components turns into a great deal of work and expense. If o-ring connection fittings could be turned into a high volume production item, such as a molded part, then the unit costs would decrease, making them a cost effective alternative for removable connections.

SUMMARY OF THE INVENTION

The invention at hand includes both a process for molding fittings using gas-assist molding techniques, and the invention of the fitting itself. Historically, the gas-assist process has been used as a weight reduction technique in molding plastic components. The process provides a means to hollow out injection molded parts, thereby minimizing material usage requirements. This process has not been used for through components or the like, but removal of the endpieces of the as-molded fitting yields through parts.

The method for molding a fitting using gas-assist molding techniques includes the steps of closing a mold to create a part cavity, injecting a resin into the mold, injecting a gas into a resin stream to create a hollow section in a part, opening the mold, ejecting an as-molded part using conventional mold ejection techniques, and removing an overflow segment and an inlet portion from the as-molded part, resulting in a hollow fitting.

The molded tubing fitting formed in this process invention is a through fitting which incorporates features representing o-rings installed on a part into the mold and ultimately into the exterior surface of the molded fitting. This process may eliminate injection molded o-ring fittings from the connection entirely. Fitting connections of this type may also experience an increased sealing pressure at higher pressure ranges due to the internal expansion of the malleable fitting. Further applications may include manifolds or parts with internal passageways. While this preferred embodiment is shown with two ports, it should be evident, to one skilled in the art, that more than two ports may be used.

It is therefore an object of the present invention to manufacture fittings employing gas-assist molding techniques.

It is another object of the present invention to provide a fitting manufactured employing gas-assist molding techniques with sealing features formed integrally thereon.

It is a further object of the present invention to provide a fitting manufactured employing gas-assist molding techniques that includes higher working pressure ranges, as well as reduced manufacturing costs and assembly time.

It is still a further object of the present invention to manufacture fittings with curved passageways.

Still other objects, features, and advantages of the present invention will become evident to those of ordinary skill in the art in light of the following.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. It is further to be understood that the figures are not necessarily to scale, and some features may be exaggerated to show details of particular components or steps.

The invention at hand is a process for molding tubing fittings using gas-assist molding techniques, and the apparatus created through the process, a fitting with integral sealing features. Historically, the gas-assist process has been used as a weight reduction technique in molding plastic components. The process provides a means to hollow out injection molded parts, thereby minimizing material usage requirements. This process has not been used for through components or the like, but removal of the endpieces of the as-molded fitting from the center section yields through parts.

Figure 1:
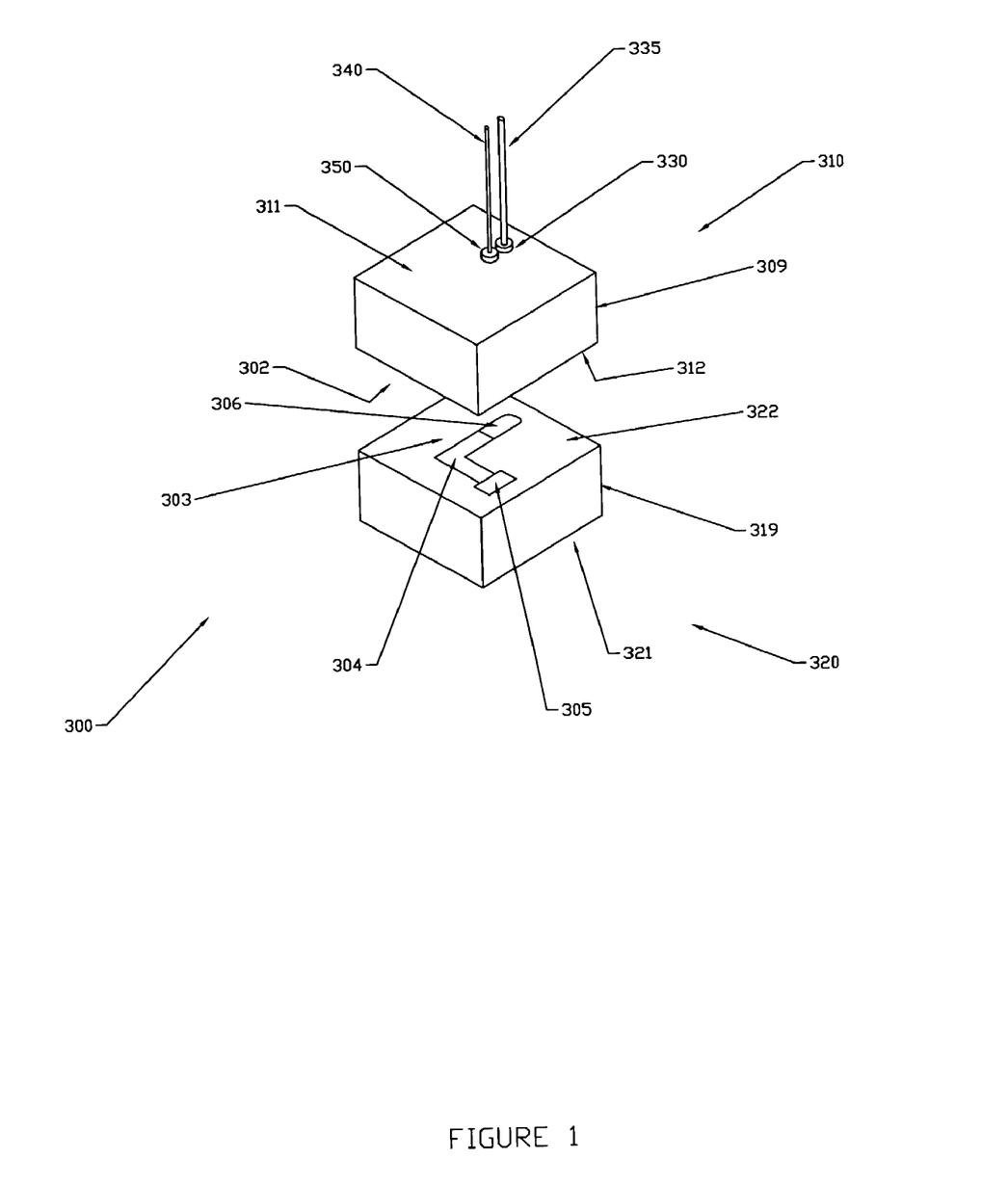
FIG. 1 is an isometric view illustrating a typical mold and mold components.
Figure 2:
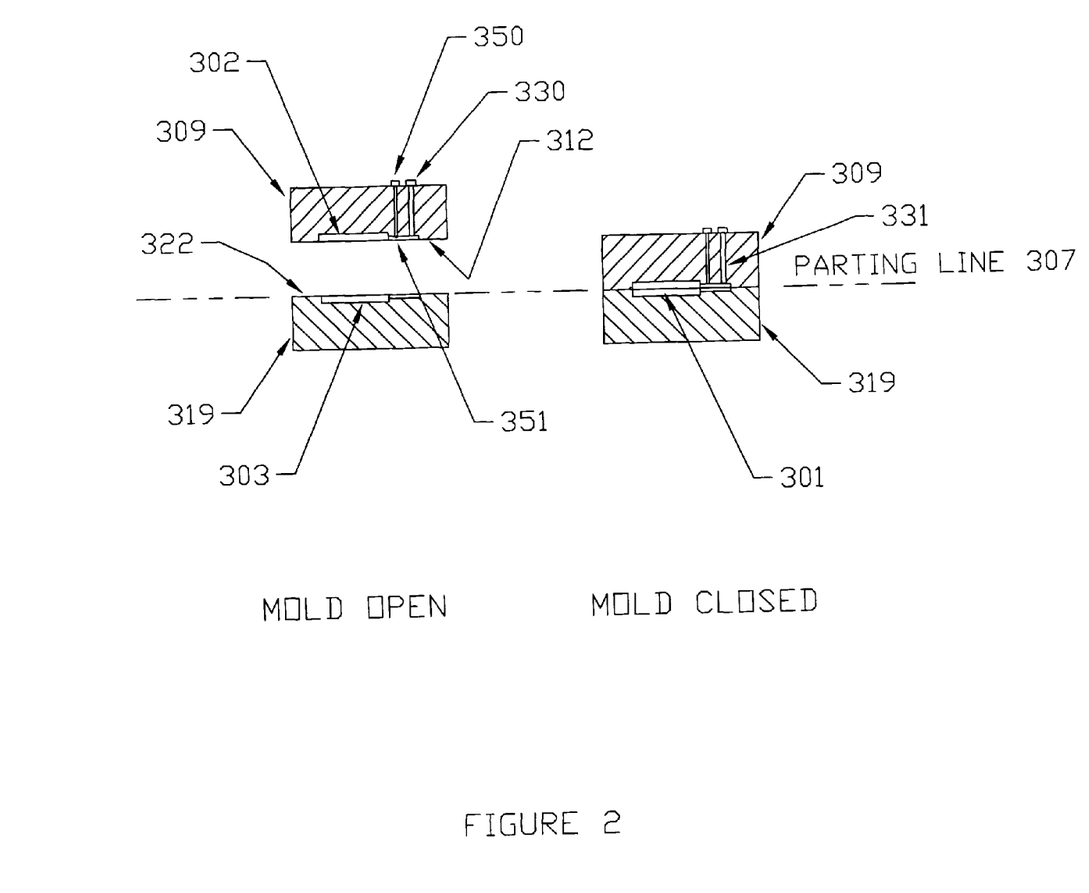
FIG. 2 is a cross section illustrating a mold, taken through the centerlines of the gas line connection and a sprue connection, in the open and closed positions.
Figure 3:
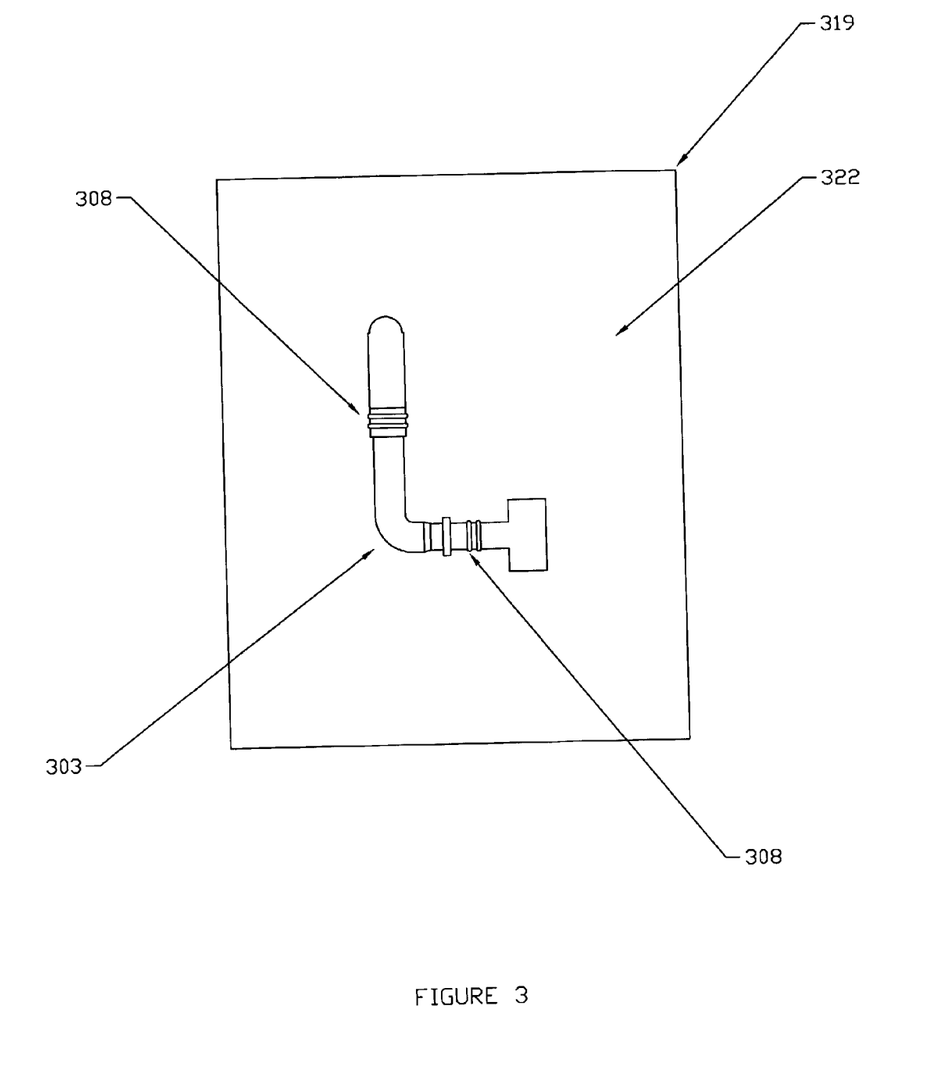
FIG. 3 is a top plan view illustrating the cavity side of the "B" plate showing half of a part cavity.

As shown in FIGS. 1, 2 and 3, an injection mold 300 for the gas assist process includes an "A" side 310 and a "B" side 320, wherein the two mate together to form a part cavity 301 where a part is molded. Both the "A" side 310 and the "B" side 320 each have an outer side 311 and 321 and a cavity side 312 and 322, respectively. The "A" side 310 consists of the "A" side mold plate 309, a sprue connection 330, a gas line connection 350 and an "A" side part cavity 302. A material feed line 335 connects to the sprue connection 330 to provide resin for molding. A gas line 340, connectable to a gas line connection 350, is also connected to a gas source. The gas, nitrogen in this preferred embodiment, is for injecting into a resin stream. The "B" side 320 contains a "B" side mold plate 319 with a "B" side part cavity 303 on the cavity side 322.

In an injection mold, the "A" side 310 and the "B" side 320 are restrained so they can only move in the up, away from, and down, together, direction, or mold 300 open or closed as shown in the cross section of FIG. 2. In the mold 300 closed position, cavity sides 312 and 322 face off on each other to close off a part cavity 301 along a parting line 307. A part cavity 301 is typically a hollow section in the plates representative of the outer surface of the part to be molded. In this preferred embodiment, the part cavity 301 is made up of a fitting cavity 304 which is connected to an overflow cavity 305 and an inlet portion cavity 306. A part cavity 301 usually is formed in both the "A" side 310 and the "B" side 320 to keep a system balanced. In this preferred embodiment, the "A" side part cavity 302 and the "B" side part cavity 303 each have inverse sealing features 308 representing installed o-rings on the part. FIG. 3 provides a detail view of the "B" side part cavity 303 and the inverse sealing features 308 integral to the part cavity 303.

Figure 4:
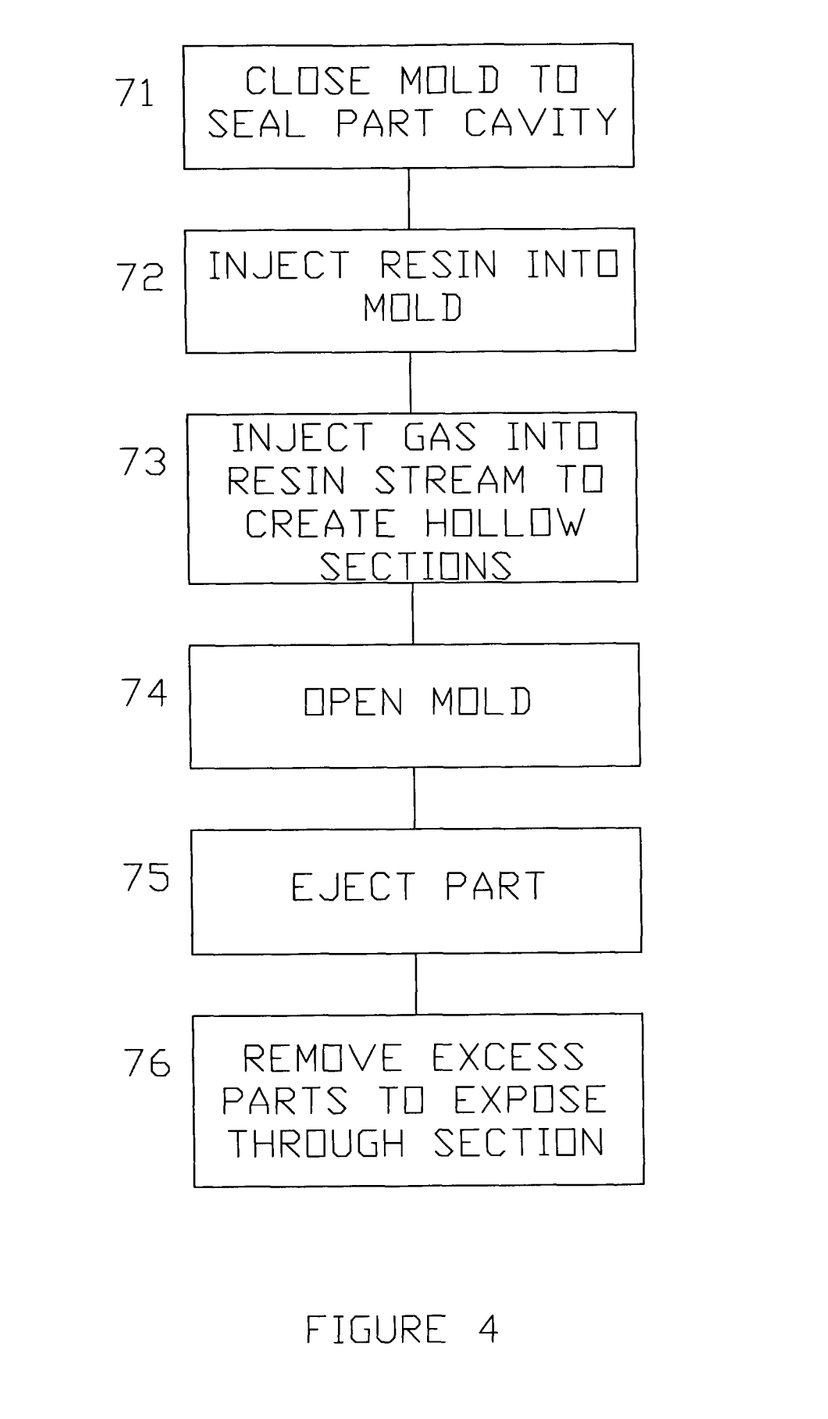
FIG. 4 is a flowchart illustrating a method of molding through parts using gas-assist molding techniques.

FIG. 4 provides a method flowchart of the gas-assist molding of through parts process. In step 71, a mold 300 is closed to seal a part cavity 301. Upon closing, resin, in this preferred embodiment sanoprene, is injected into the mold 300 through a sprue connection 330 as shown in step 72. Once in the mold 300, the resin must pass through a runner 331 to enter the part cavity 301. In step 73, during injection of the resin, a higher pressure gas, nitrogen, in this preferred embodiment, moves from a gas line 340 through a gas line connection 350, and is injected into the resin stream through a gas pin 351. The resin enters the part cavity in the inlet portion cavity 306, moves through the fitting cavity 304 towards the overflow cavity 305. Upon injection into the resin stream and entering the part cavity 301, the higher pressure gas finds an equilibrium in the center of the larger cavities thereby creating a hollow section. Excess resin is then pushed into the overflow cavity 305 by the higher pressure gas. After the appropriate cycle time, the mold 300 is opened as indicated in step 74, and a molded tubing fitting 10 is ejected through conventional mold ejection techniques as shown in process step 75.

Figure 5:
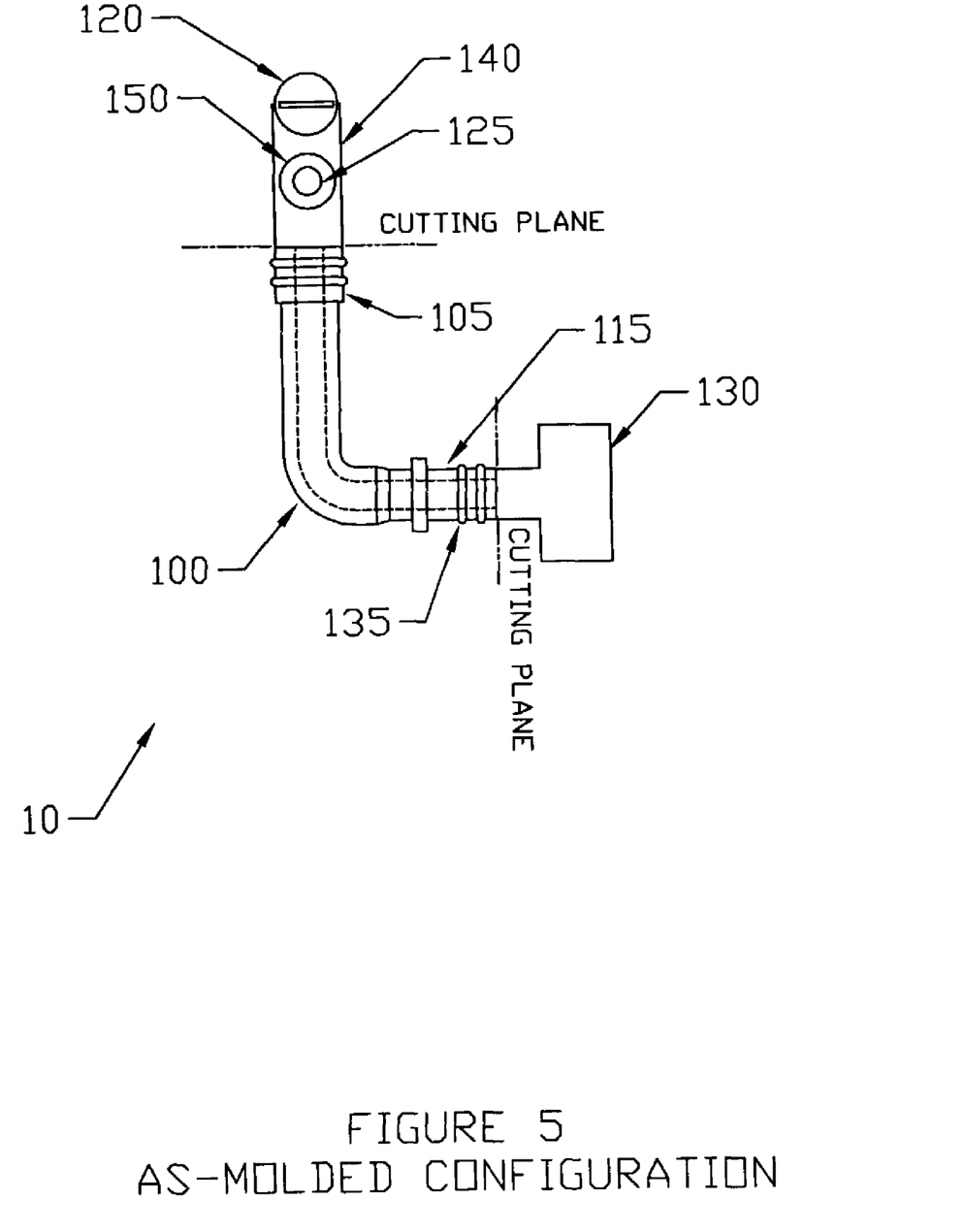
FIG. 5 is a front elevation view illustrating the molded tubing fitting in the as-molded configuration.

As shown in FIG. 5, a molded tubing fitting 10 is molded with a tubing portion 100 having two ports, an inlet port 105 and an outlet port 115. The inlet port 105 is connectable to an inlet portion 140, and the outlet port 115 is connectable to an overflow segment 130. The tubing portion 100 is a hollow cylindrical cross section with a 90 degree bend. A sprue boss 120 is located on the top end of the inlet portion 140 where the flowing material enters the mold. A gas pin boss 150 is located near the sprue boss 120 on the inlet portion 140. A gas pin hole 125 in the gas pin boss 150 is where the gas enters the mold for pressurization. The overflow segment 130 is designed to aid the mold in fully filling by accepting any overage of material shot size.

Figure 6:
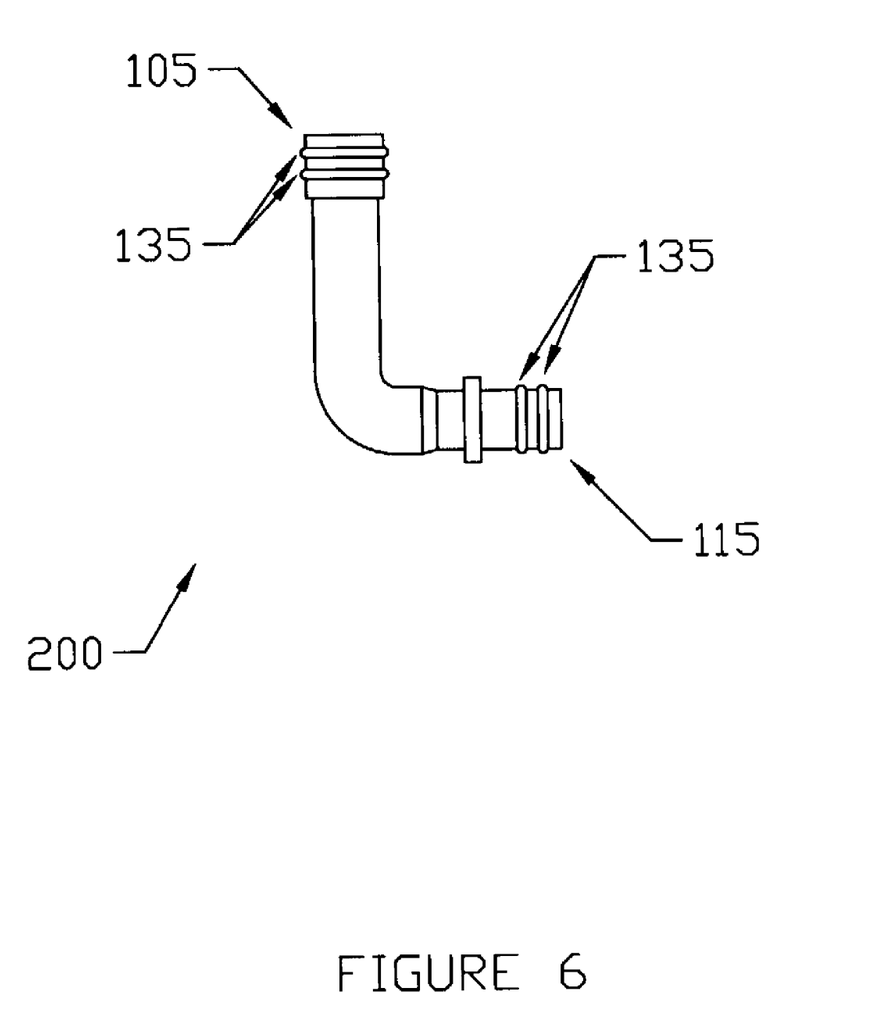
FIG. 6 is a front elevation view illustrating the molded tubing fitting in the as-used configuration.
Figure 7:
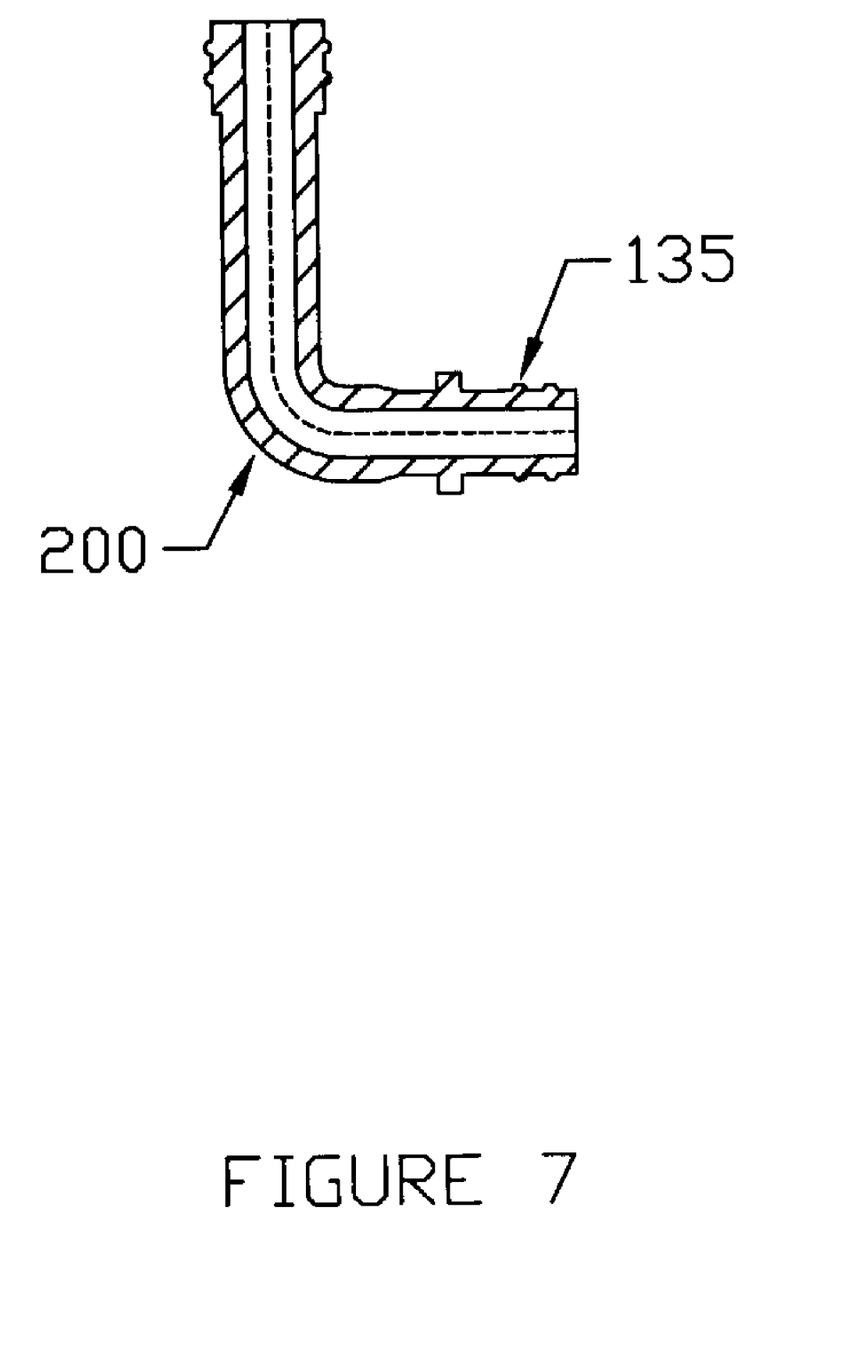
FIG. 7 is a cross section view illustrating the molded tubing fitting taken through the centerlines of each axial member.

Upon removal from the mold 300, the molded tubing fitting 10 is a one piece unit with no orifices other than a gas pin hole 125 in the gas pin boss 150. The ends of the hollow cylindrical cross section of the tubing portion 100 are sealed through attachment with the inlet portion 140 and the overflow segment 130. To obtain a part with a passageway or a through part, the overflow segment 130 and the inlet portion 140 must be cut off as described in step 76 and shown in FIG. 5. Removal of the inlet portion 140 and the overflow segment 130 as described leaves a hollow tubing fitting 200 for use as a molded fitting as shown in FIG. 6. Both the inlet port 105 and the outlet port 115, in this embodiment process, are equipped with two o-ring features 135 for sealing, as well as restraining features to lock the connected ends in place. FIG. 7 provides a detailed cross section of the molded tubing fitting 200. The o-ring features 135 are designed to provide the fitting 200 with o-ring equivalent sealing features without the use of o-rings. It should be noted, to one skilled in the art, that the sealing features can be of any shape or form to accomplish sealing in the system. The cross section view in FIG. 7 also shows the cored out passageway of fitting 200.

The advantage of not needing an o-ring is magnified by the costs associated with making o-ring connectors and tubing assemblies, as well as the labor associated with installation of the o-rings. Tubing assemblies are typically made from stainless steel tubing which is cut to length, separate machined o-ring connectors, and a welding process to make the parts one integral unit. The preferred embodiment of this invention will eliminate welding and assembly labor associated with previously welded assemblies.

Another benefit of using the preferred embodiment is the ability to increase sealing pressure between the o-ring feature 135 and a sealing face under higher operating pressures. This effect occurs when higher pressure internal to the tubing system forces the inside diameter of the tubing fitting 200 to stretch, pressing even harder on the interior face of the mating surface. This effect exists because the molded tubing fitting material is malleable. Standard o-ring seals have a limiting working pressure where the seal integrity is acceptable. Beyond that range, o-ring seals will leak.

While the preferred embodiment has been shown to have two ports, it is clearly apparent to one skilled in the art that this process may be applied to components with more than two ports. This process clearly has the flexibility to make fittings, manifolds and tubing components of virtually any length or shape at a reduced cost in high volume applications. Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

We claim:
1. A method for molding a fitting, comprising:
 closing a mold to create a part cavity, wherein the part cavity includes at least one inverse sealing feature;
 injecting a stream of resin into the part cavity to fill the part cavity and the at least one inverse sealing feature;

injecting a gas into the resin stream to create a hollow section in a part;
opening the mold;
ejecting an as-molded part; and
removing an overflow segment and an inlet portion from the as-molded part to create a hollow fitting having a sealing feature on an exposed port, wherein the sealing feature is a protrusion on the as-molded part.

2. The method of molding a fitting according to claim 1, wherein the final step is replaced with:

removing an overflow segment and an inlet portion from the as-molded part to create a hollow fitting having at least two ports, wherein each port includes a sealing feature, and further wherein the sealing feature is a protrusion on the as-molded part.

3. The method of molding a fitting according to claim 1, wherein the sealing feature is representative of an o-ring in an installed position.

* * * * *